United States Patent
Park et al.

(10) Patent No.: US 8,165,245 B2
(45) Date of Patent: Apr. 24, 2012

(54) METHOD AND APPARATUS FOR CONTROLLING TRANSMISSION POWER IN A COMMUNICATION SYSTEM

(75) Inventors: Sung-Chan Park, Seoul (KR);
Jae-Hyok Lee, Suwon-si (KR);
Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 592 days.

(21) Appl. No.: 12/393,380

(22) Filed: Feb. 26, 2009

(65) Prior Publication Data
US 2009/0213961 A1 Aug. 27, 2009

(30) Foreign Application Priority Data
Feb. 27, 2008 (KR) .................. 10-2008-0017931

(51) Int. Cl.
*H04K 1/02* (2006.01)
(52) U.S. Cl. ........ 375/297; 375/260; 375/295; 375/296; 455/63.1; 455/69; 455/114.3; 455/522
(58) Field of Classification Search .................. 375/260, 375/295, 296, 297; 455/63.1, 69, 114.3, 455/522
See application file for complete search history.

(56) References Cited

U.S. PATENT DOCUMENTS

| 2007/0066242 | A1* | 3/2007 | Yi et al. ............... 455/69 |
| 2009/0247180 | A1 | 10/2009 | Higuchi et al. |
| 2010/0220663 | A1 | 9/2010 | Sawahashi et al. |
| 2010/0239048 | A1* | 9/2010 | Lee et al. ............ 375/297 |

FOREIGN PATENT DOCUMENTS

| KR | 10-2000-0001147 A | 1/2000 |
| WO | 2004/025973 A1 | 3/2004 |
| WO | 2006/132247 A1 | 12/2006 |
| WO | 2007/052812 A1 | 5/2007 |

* cited by examiner

*Primary Examiner* — Leon Flores
(74) *Attorney, Agent, or Firm* — Jefferson IP Law, LLP

(57) ABSTRACT

In a communication system, a mobile terminal compares a first modulation/Forward Error Correction (FEC) rate level, which is a modulation/FEC rate level used in a previously transmitted signal, with a second modulation/FEC rate level, which is a modulation/FEC rate level to be used in a currently transmitted signal. If the second modulation/FEC rate level is higher than the first modulation/FEC rate level, the mobile terminal determines the transmission power using a normalized Carrier to Noise ratio (C/N) corresponding to the second modulation/FEC rate level on an ascending normalized C/N table, while if the second modulation/FEC rate level is lower than the first modulation/FEC rate level, the mobile terminal determines the transmission power using a normalized C/N corresponding to the second modulation/FEC rate level on a descending normalized C/N table.

10 Claims, 3 Drawing Sheets

METHOD AND APPARATUS FOR CONTROLLING TRANSMISSION POWER IN A COMMUNICATION SYSTEM

PRIORITY

This application claims the benefit under 35 U.S.C. §119 (a) of a Korean patent application filed in the Korean Industrial Property Office on Feb. 27, 2008 and assigned Serial No. 10-2008-0017931, the entire disclosure of which is hereby incorporated by reference.

BACKGROUND OF THE INVENTION

1. Field of the Invention

The present invention relates to a method and an apparatus for controlling transmission power in a communication terminal.

2. Description of the Related Art

In general, an important factor for improving signal transmitting/receiving performance is the control of transmission power in a communication system. In the case of an uplink, a Mobile Station (MS) transmits a signal by minimizing power consumption in a range where a Base Station (BS) can normally receive the signal from the MS.

Hereinafter, it is assumed that a communication system uses an Orthogonal Frequency Division Multiple Access (OFDMA) scheme. Also, a communication system that uses the OFDMA method is referred to as an "OFDMA communication system."

In the OFDMA communication system, an MS transmits an uplink signal to a BS using transmission power determined by a preset power control algorithm. The BS receives the uplink signal, and estimates the Carrier to Interference and Noise Ratio (CINR). The BS compares the estimated CINR with a preset reference CINR, and transmits a control message for controlling the transmission power of the MS in accordance with the result of the comparison to the MS. Here, the control message includes transmission power control information for controlling the transmission power of the MS. The MS receives the control message transmitted from the BS, determines the transmission power using the transmission power control information included in the received control message, and transmits a subsequent link signal using the determined transmission power.

In determining the transmission power, the MS uses a normalized Carrier to Noise ratio (C/N) as represented in Table 1 below.

TABLE 1

| Modulation/FEC rate | Normalized C/N |
| --- | --- |
| ACK region | −3.0 |
| FAST FEEDBACK | 0 |
| CDMA code | 3 |
| QPSK 1/3 | 0.5 |
| QPSK 1/2 | 6 |
| QPSK 2/3 | 7.5 |
| QPSK 3/4 | 9 |
| 16-QAM-1/2 | 12 |
| 16-QAM-2/3 | 14.5 |
| 16-QAM-3/4 | 15 |
| 16-QAM-5/6 | 17.5 |
| 64-QAM-1/2 | 18 |
| 64-QAM-2/3 | 20 |
| 64-QAM-3/4 | 21 |
| 64-QAM-5/6 | 23 |

In Table 1, normalized C/Ns corresponding to modulation/Forward Error Correction (FEC) rates are shown. As can be seen in Table 1, as the level of modulation/FEC is increased, the corresponding normalized C/N increases. That is, among the modulation/FEC rates, the modulation/FEC rate corresponding to the ACKnowledgement (ACK) region has the lowest level, and the modulation/FEC rate corresponding to the 64-Quadrature Amplitude Modulation (QAM)-5/6 has the highest level.

As shown in Table 1, in the case of transmitting an ACK region signal, the MS uses transmission power of −3.0 dB by default, while in the case of transmitting a Quadrature Phase Shifting Keying (QPSK)-1/2 signal, the MS uses transmission power of 6 dB by default. Here, the QPSK is a kind of modulation method, and 1/2 indicates a code rate. FIG. 1 is a flowchart illustrating an example of the process of transmitting/receiving signals using a normalized C/N table in an OFDMA communication system according to the related art. Here, it is assumed that Table 1 is used as the normalized C/N table.

Before describing the process as illustrated in FIG. 1, in the case of using the normalized C/N corresponding to the modulation/FEC rate as a default value as indicated in Table 1, the receiving performance for each modulation/FEC rate may differ depending on the channel state between the BS and the MS. Accordingly, the CINR required for the respective MS may be differently set depending on the channel state of the MS. Here, the required CINR denotes the CINR required for the BS to normally receive the signal of the MS.

Table 2 below represents Bandwidth Request (BR) Code Division Multiple Access (CDMA) code required CINRs and QPSK-1/2 required CINRs.

TABLE 2

| | BR CDMA Code Required CINR | QPSK 1/2 Required CINR |
| --- | --- | --- |
| Channel A | 2 dB | 4 dB |
| Channel B | 2.5 dB | 5 dB |
| Channel C | 3 dB | 6 dB |

Referring to Table 2, it is assumed that MS A using channel A, MS B using channel B, and MS C using channel C exist, and that a channel between MS A and the BS, a channel between MS B and the BS, and a channel between MS C and the BS are called "channel A", "channel B", and "channel C", respectively. It is also assumed that channel A is best, channel B is worse than channel A but better than channel C, and channel C is good. In this case, MS A is set to have the lowest BR CDMA code and the lowest QPSK-1/2 required CINR, and MS C is set to have the highest BR CDMA code and the highest QPSK-1/2 required CINR. Accordingly, it is required that the BS sets the normalized C/N value based on the channel having the worst channel state, i.e. channel C. That is, as represented in Table 1, the normalized C/N is determined by reflecting the requested CINR of the MS having the worst channel state.

Referring to FIG. 1, it is assumed that the channel state between MS 100 and BS 150 corresponds to channel A. In step 111, in the case of transmitting QPSK-1/2 data, MS 100 sets the default value of the transmission power to the normalized C/N of 6 dB as represented in Table 1. MS 100 transmits the QPSK-1/2 data to BS 150 using the determined normalized C/N of 6 dB. In step 115, BS 150 determines the QPSK-1/2 required CINR of 4 dB and the MS required CINR of 4 dB through a power control algorithm. Accordingly, although not illustrated in FIG. 1, BS 150 informs MS 100 that the required CINR is 4 dB.

If BS 150 informs MS 100 that the required CINR is 4 dB, MS 100 sets its own set point to 4 dB. BS 150 transmits a power control message including the corresponding transmission power correction information to MS 100. MS 100, having received the message, determines the transmission power that suits the required CINR of 4 dB through the transmission power correction information. If it is required for MS 100 to transmit the BR CDMA code in step 120, MS 100 detects that the modulation/FEC rate level of the BR CDMA code is lower than the modulation/FEC rate level of the QPSK-1/2 data with reference to Table 1. Also, MS 100 detects that the normalized C/N of the BR CDMA code is 3 dB with reference to Table 1, and detects the difference between the detected normalized C/N and the normalized C/N applied to the previously transmitted signal, i.e. 6 dB applied to the QPSK-1/2 data, which is 3 dB. Then, since the modulation/FEC rate level of the BR CDMA code to be currently transmitted is lower than the modulation/FEC rate level of the previously transmitted QPSK-1/2 data, MS 100 determines the transmission power by reflecting the difference value of 3 dB between the previously transmitted power value, i.e., the power with which the QPSk-1/2 data was transmitted, which is 6 dB, and the normalized C/N of the BR CDMA code, which is 3 dB, and transmits the BR CDMA code to BS 150.

In step 125, Since the received CINR of the BR CDMA code, which is 1 dB, is less than the required CINR of Table 2, which is 2 dB, the probability that BS 150 cannot receive the BR CDMA code of MS 100 is increased.

The reason why BS 150 cannot receive the BR CDMA code is that MS 100 determines the transmission power of the BR CDMA code in consideration of only the CDMA code normalized C/N of 3 dB and the QPSK-1/2 normalized C/N of 6 dB in Table 1. That is, although the set point of MS 100 has already been set in consideration of the required CINR received from BS 150, MS 100 unconditionally determines the transmission power of the BR CDMA code in consideration of only the normalized C/N difference in Table 1, and thus BS 150 cannot receive the BR CDMA code.

As described above, the reason why the BS cannot receive the BR CDMA code in FIG. 1 is that the MS uses only one fixed normalized C/N table without considering wireless channel circumstances.

FIG. 2 is a flowchart illustrating another example of a process of transmitting/receiving signals using a normalized C/N table in an OFDMA communication system according to the related art. Here, it is assumed that Table 1 is used as the normalized C/N table.

Before describing the process as illustrated in FIG. 2, it is assumed that, unlike Table 1, the normalized C/N for use in the QPSK-1/2 data is 5 dB, and the channel state between MS 200 and BS 250 corresponds to channel C.

Referring to FIG. 2, in the case of transmitting the BR CDMA code in step 211, MS 200 transmits the default value of the transmission power to BS 250 using the transmission power of the normalized C/N of 3 dB as represented in Table 1. In accordance with the power control algorithm, in step 215, the BR CDMA required CINR is set to 3 dB, and although not separately illustrated in FIG. 2, BS 250 transmits a power message including the corresponding transmission power correction information to MS 200, and MS 200, having received the power message, determines the transmission power that suits the required CINR of 3 dB by reflecting the transmission power correction information.

In step 220, BS 250 transmits a CDMA allocation Information Element (hereinafter referred to as "CDMA Alloc IE") including bandwidth allocation information in accordance with a bandwidth allocation request of MS 200 to MS 200.

MS 200, having received the CDMA Alloc IE, detects that it should transmit a BR header. Here, since the BR header is the QPSK-1/2 data, MS 200 detects that the modulation/FEC rate level of the QPSK-1/2 data is higher than the modulation/FEC rate level of the CDMA code with reference to Table 1. Also, MS 200 detects that the normalized C/N of the QPSK-1/2 data is 5 dB and detects the difference between the detected normalized C/N and the normalized C/N used in the previously transmitted signal, i.e. the BR CDMA code, which is 2 dB. Then, since the modulation/FEC rate level of the BR header to be currently transmitted is higher than the modulation/FEC rate level of the previously transmitted BR CDMA code, MS 200 determines the transmission power by reflecting the difference value of 2 dB between the normalized C/N of the QPSK-1/2 data, which is 5 dB, and the previously transmitted power value, i.e., the power with which the BR CDMA code was transmitted, which is 3 dB, and then in step 225, transmits the BR header to BS 250 with the determined transmission power. However, since the received CINR of the BR header, which is 5 dB, is less than the required CINR represented in Table 2, which is 6 dB, the probability that BS 250 cannot receive the BR header is increased in step 230.

As described above with reference to FIGS. 1 and 2, since the MS in the OFDMA communication system according to the related art transmits signals using the preset normalized C/N irrespective of the channel state, the BS may not receive the signal from the MS, and this may cause the performance of the OFDMA communication system to deteriorate.

Therefore, there exists a need for an improved apparatus and method for controlling transmission power in a communication terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for controlling transmission power in a communication terminal.

Another aspect of the present invention is to provide an apparatus and a method for controlling transmission power in consideration of a channel state in a communication system.

In accordance with an aspect of the present invention, an apparatus in a mobile terminal for determining transmission power in a communication system is provided. The apparatus compares a first modulation/Forward Error Correction (FEC) rate level, which is a modulation/FEC rate level used in a previously transmitted signal, with a second modulation/FEC rate level, which is a modulation/FEC rate level to be used in a currently transmitted signal, if the second modulation/FEC rate level is higher than the first modulation/FEC rate level, the apparatus determines a transmission power using a normalized Carrier to Noise ratio (C/N) corresponding to the second modulation/FEC rate level on an ascending normalized C/N table, and if the second modulation/FEC rate level is lower than the first modulation/FEC rate level, the apparatus determines a transmission power using a normalized C/N corresponding to the second modulation/FEC rate level on a descending normalized C/N table.

In accordance with another aspect of the present invention, an apparatus in a mobile terminal for determining transmission power in a communication system is provided. The apparatus compares a first modulation/Forward Error Correction (FEC) rate level, which is a modulation/FEC rate level used in a previously transmitted signal, with a second modulation/FEC rate level, which is a modulation/FEC rate level to be used in a currently transmitted signal, and the apparatus determines the transmission power using a normalized Carrier to Noise ratio (C/N) corresponding to the second modulation/FEC rate level and a normalized C/N offset on a normalized C/N table in accordance with the result of the comparison.

In accordance with still another aspect of the present invention, a method of determining transmission power in a communication system is provided. The method includes comparing a first modulation/Forward Error Correction (FEC) rate level, which is a modulation/FEC rate level used in a previously transmitted signal, with a second modulation/FEC rate level, which is a modulation/FEC rate level to be used in a currently transmitted signal, if the second modulation/FEC rate level is higher than the first modulation/FEC rate level, determining a transmission power using a normalized Carrier to Noise ratio (C/N) corresponding to the second modulation/FEC rate level on an ascending normalized C/N table, and if the second modulation/FEC rate level is lower than the first modulation/FEC rate level, determining a transmission power using a normalized C/N corresponding to the second modulation/FEC rate level on a descending normalized C/N table.

In accordance with yet another aspect of the present invention, a method of determining transmission power in a communication system is provided. The method includes comparing a first modulation/Forward Error Correction (FEC) rate level, which is a modulation/FEC rate level used in a previously transmitted signal, with a second modulation/FEC rate level, which is a modulation/FEC rate level to be used in a currently transmitted signal, and determining a transmission power using a normalized Carrier to Noise ratio (C/N) corresponding to the second modulation/FEC rate level and a normalized C/N offset on a normalized C/N table in accordance with the result of the comparison.

In accordance with another exemplary embodiment of the present invention, a method of determining transmission power in a communication system is provided. The method includes transmitting a first signal using a first modulation/Forward Error Correction (FEC) rate and a first transmission power, transmitting a second signal using a second modulation/FEC rate and a second transmission power, wherein, if the second modulation/FEC rate level is higher than the first modulation/FEC rate level, the second transmission power is determined using a normalized Carrier to Noise ratio (C/N) corresponding to the second modulation/FEC rate level on an ascending normalized C/N table, and if the second modulation/FEC rate level is lower than the first modulation/FEC rate level, the second transmission power is determined using a normalized C/N corresponding to the second modulation/FEC rate level on a descending normalized C/N table.

With the above exemplary configurations, a communication system controls the transmission power in consideration of the channel state, and thus it is possible to transmit/receive signals with accurate consideration of the channel state between a Mobile Station (MS) and a Base Station (BS). Since the signal transmission/reception is possible with accurate consideration of the channel state between the MS and the BS, the BS is prevented from being unable to receive the signals transmitted from the MS, and thus the performance of the OFDMA communication system is improved.

Other aspects, advantages, and salient features of the invention will become apparent to those skilled in the art from the following description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF THE EXEMPLARY EMBODIMENT

Figure 1:
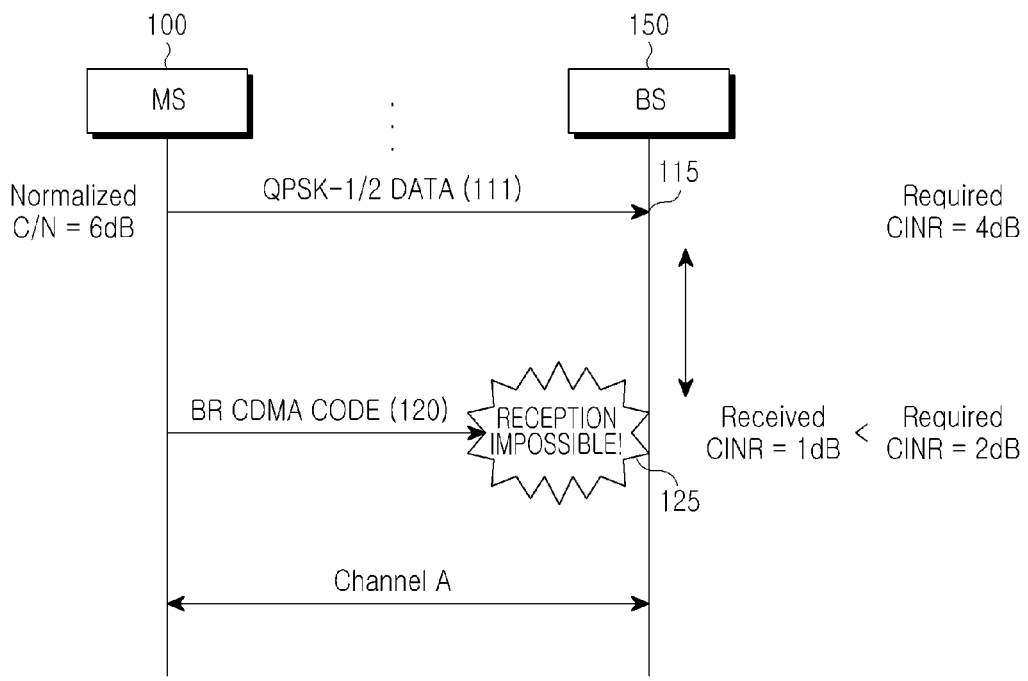
FIG. 1 is a flowchart illustrating an example of the process of transmitting/receiving signals using a normalized C/N table in an Orthogonal Frequency Division Multiple Access (OFDMA) communication system according to related art.
Figure 2:
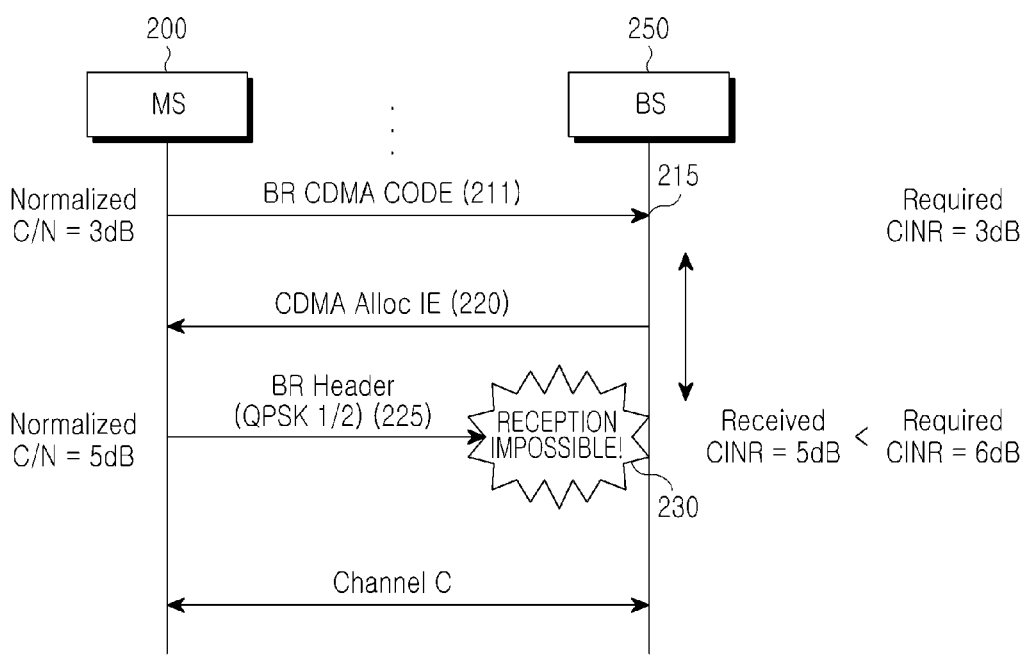
FIG. 2 is a flowchart illustrating another example of the process of transmitting/receiving signals using a normalized C/N table in an OFDMA communication system according to related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose an apparatus and a method for controlling transmission power in a communication system, e.g. in a communication system using an Orthogonal Frequency Division Multiple Access (OFDMA) method (hereinafter referred to as "OFDMA communication system").

In explaining exemplary embodiments of the present invention, it is assumed that the OFDMA communication system is an Institute of Electrical and Electronics Engineers (IEEE) 802.16 communication system. However, the apparatus and the method for controlling transmission power proposed according to exemplary embodiments of the present invention can be applied to not only the IEEE 802.16 communication system but also other communication systems. Furthermore, an exemplary apparatus for implementing the present invention may be a dedicated component in a Mobile Station for performing the following functions or may include an existing component, such as a controller of a Mobile Station, having been modified to perform the following functions.

A normalized Carrier to Noise ratio (C/N) table proposed according to exemplary embodiments of the present invention will be described. The normalized C/N table is classified into two types, i.e. an ascending normalized C/N table and a descending normalized C/N table, which will now be described in more detail.

First, an exemplary ascending normalized C/N table is illustrated in Table 3 below.

TABLE 3

| Modulation/FEC rate | Ascending Normalized C/N |
|---|---|
| ACK region | −3.0 |
| FAST FEEDBACK | 0 |
| CDMA code | 3 |
| QPSK ⅓ | 0.5 |
| QPSK ½ | 7 |
| QPSK ⅔ | 9 |
| QPSK ¾ | 11 |
| 16QAM-½ | 15 |
| 16QAM-⅔ | 17 |
| 16QAM-¾ | 19 |
| 16QAM-⅚ | 21 |
| 64QAM-½ | 23 |
| 64QAM-⅔ | 25 |
| 64QAM-¾ | 27 |
| 64QAM-⅚ | 29 |

As represented in Table 3, the ascending normalized C/N table is used in the case where the level of a modulation/Forward Error Correction (FEC) rate to be used in data to be currently transmitted by a Mobile Station (MS) is changed to a level higher than the level of the modulation/FEC rate used in previously transmitted data. In Table 3, the modulation/FEC rate corresponding to the ACKnowledgement (ACK) region has the lowest level, and the modulation/FEC rate corresponding to the 64-Quadrature Amplitude Modulation (QAM)-5/6 has the highest level.

Second, an exemplary descending normalized C/N table is illustrated in Table 4 below.

TABLE 4

| Modulation/FEC rate | Descending Normalized C/N |
|---|---|
| ACK region | −3.0 |
| FAST FEEDBACK | 0 |
| CDMA code | 3 |
| QPSK ⅓ | 0.5 |
| QPSK ½ | 5 |
| QPSK ⅔ | 6 |
| QPSK ¾ | 7 |
| 16QAM-½ | 9 |
| 16QAM-⅔ | 10 |
| 16QAM-¾ | 11 |
| 16QAM-⅚ | 13 |
| 64QAM-½ | 15 |
| 64QAM-⅔ | 17 |
| 64QAM-¾ | 19 |
| 64QAM-⅚ | 21 |

As illustrated in Table 4, the descending normalized C/N table is used in the case where the level of the modulation/FEC rate to be used in the data to be currently transmitted by MS is changed to a level lower than the level of the modulation/FEC rate used in the previously transmitted data. In Table 4, the modulation/FEC rate corresponding to the ACK region has the lowest level, and the modulation/FEC rate corresponding to the 64QAM-5/6 has the highest level.

As illustrated in Table 3 and Table 4, the normalized C/N difference between the modulation/FEC rate levels set in the ascending normalized C/N table is set to be relatively larger than the normalized C/N difference between the modulation/FEC rate levels set in the descending normalized C/N table.

Figure 3:
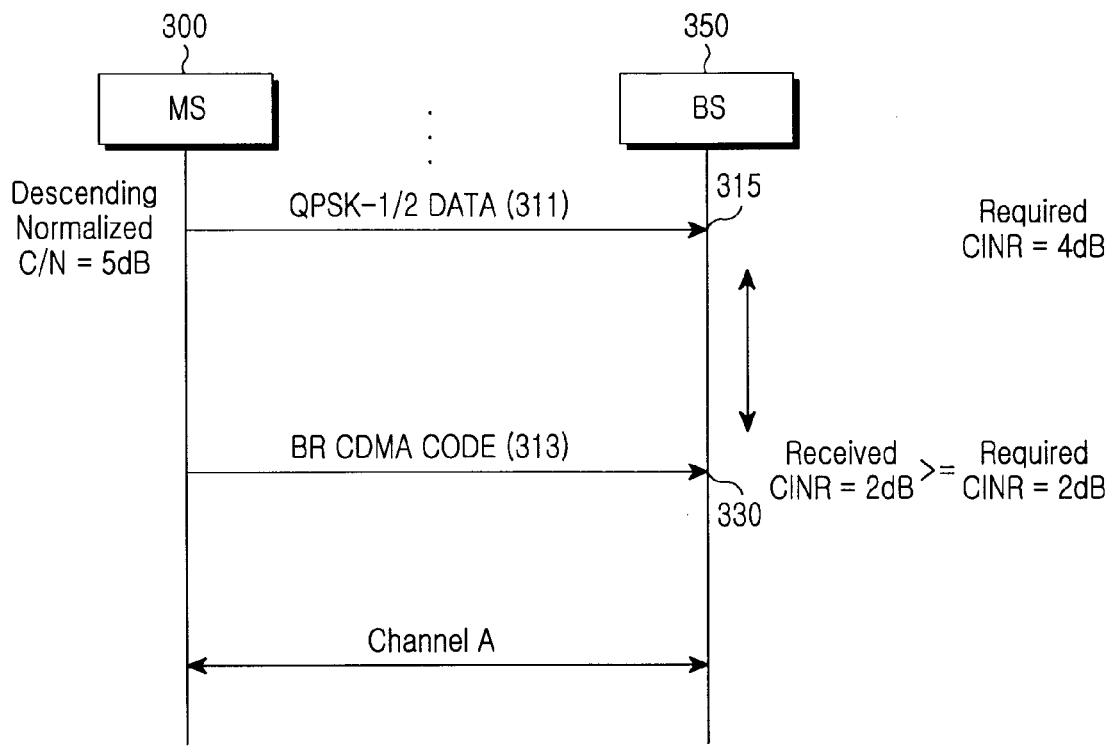
FIG. 3 is a flowchart illustrating a process of transmitting/receiving signals by controlling transmission power using a descending normalized C/N table in an IEEE 802.16 communication system according to an exemplary embodiment of the present invention.

FIG. 3 is a flowchart illustrating a process of transmitting/receiving signals by controlling transmission power using a descending normalized C/N table in an IEEE 802.16 communication system according to an exemplary embodiment of the present invention.

Referring to FIG. 3, it is assumed that the channel state between MS 300 and a Base Station (BS) 350 corresponds to channel A. Here, since the channel state and the required Carrier to Interface and Noise Ratio (CINR) corresponding to the channel state are the same as those described with reference to Table 2, a description thereof will be omitted. In step 311, in the case of transmitting QPSK-1/2 data, MS 300 sets the value of the corresponding transmission power. Here, the default value of the corresponding transmission power is set using the previously used normalized C/N table. In an exemplary implementation illustrated in FIG. 3, the previously used normalized C/N table is a descending normalized C/N table as illustrated in Table 4. Accordingly, MS 300 sets the default value of the transmission power to 5 dB with reference to the descending normalized C/N table as represented in Table 4. MS 300 transmits the QPSK-1/2 data to BS 350 using the set normalized C/N of 5 dB. In accordance with the power control algorithm, the required CINR of the BR CDMA code is set to 4 dB in step 315, and although not illustrated in FIG. 3, BS 350 transmits a power control message including the corresponding transmission power correction information to MS 300. MS 300, having received the power control message, determines the transmission power that suits the required CINR of 4 dB by reflecting the transmission power correction information. At this time, if MS 300 is required to transmit the BR CDMA code, MS 300 compares the levels of the previously transmitted signal, i.e. the QPSK-1/2 data, and the signal to be currently transmitted, i.e. the modulation/FEC rate of the BR CDMA code. Since the modulation/FEC rate level of the previously transmitted signal is higher than the modulation/FEC rate level of the signal to be currently transmitted as a result of the comparison, MS determines that it should determine the transmission power using the descending normalized C/N as represented in Table 4.

Accordingly, MS 300 determines the transmission power by reflecting the difference value of 2 dB between the power with which the QPSK-1/2 data was transmitted, which is 5 dB, and the descending normalized C/N of the BR CDMA code, which is 3 dB. In step 330, MS 300 then transmits the BR CDMA code to BS 350 using the determined transmission power in step 325.

Accordingly, since the received CINR of the BR CDMA code satisfies the required CINR of BS 350, which is 2 dB, BS 350 can normally receive the BR CDMA code.

Figure 4:
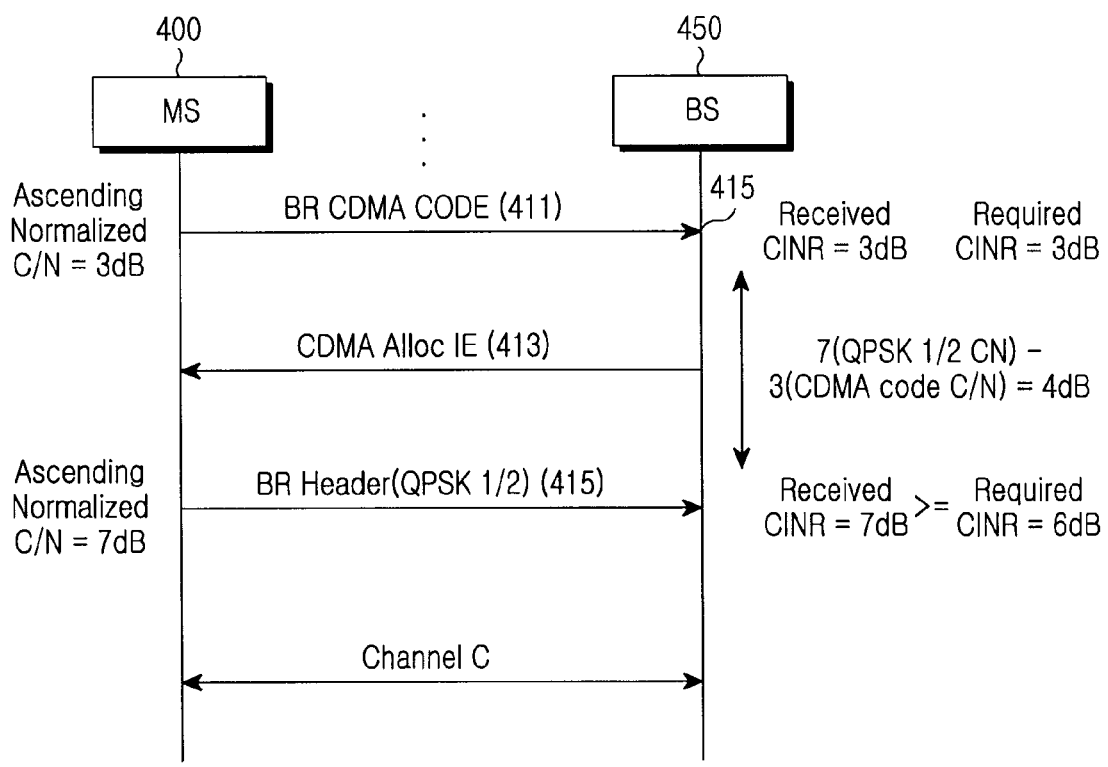
FIG. 4 is a flowchart illustrating a process of transmitting/receiving signals by controlling transmission power using an ascending normalized C/N table in an IEEE 802.16 communication system according to an exemplary embodiment of the present invention.

FIG. 4 is a flowchart illustrating a process of transmitting/receiving signals by controlling transmission power using an ascending normalized C/N table in an IEEE 802.16 communication system according to an exemplary embodiment of the present invention.

Here, it is assumed that the channel state between MS 400 and BS 450 corresponds to channel C, and since the channel state and the required CINR corresponding to the channel state are substantially the same as those described with reference to Table 2, a description thereof will be omitted.

Referring to FIG. 4, in the case of the BR CDMA code, MS 400 sets the default value of the transmission power. Here, the default value of the transmission power is set using the previously used normalized C/N table. In an exemplary implementation illustrated in FIG. 4, the previously used normalized C/N table is the ascending normalized C/N table as represented in Table 3. Accordingly, MS 400 sets the default value of the transmission power to 3 dB with reference to the ascending normalized C/N table as represented in Table 3. MS 400 transmits the BR CDMA code to BS 450 using the set normalized C/N of 3 dB in step 411. In accordance with the power control algorithm, the required CINR of the BR CDMA code is set to 3 dB in step 415, and although not illustrated in FIG. 4, BS 450 transmits a power control message including the corresponding transmission power correction information to MS 400. MS 400, having received the power control message, determines the transmission power that suits the required CINR of 3 dB through the transmission power correction information.

In step 420, BS 450 transmits a CDMA allocation Information Element (CDMA Alloc IE) to MS 400, which includes bandwidth allocation information according to a bandwidth allocation request of MS 400.

MS 400, having received the CDMA allocation information as described above, detects that it should transmit a BR header. In this case, MS 400 compares the levels of the previously transmitted signal, i.e. the BR CDMA code, and the signal to be currently transmitted, i.e. the modulation/FEC rate of the BR header. Since the modulation/FEC rate level of the previously transmitted signal is lower than the modulation/FEC rate level of the signal to be currently transmitted as a result of the comparison, MS 400 determines that it should determine the transmission power using the ascending normalized C/N as represented in Table 3.

Accordingly, MS 400 determines the transmission power by reflecting the difference value of 4 dB between the ascending normalized C/N detected from Table 3, which is 7 dB, and the ascending normalized C/N applied to the BR CDMA code, which is 3 dB. MS 400 then transmits the BR header to BS 450 with the determined transmission power in step 425.

Accordingly, since the received CINR of the BR header satisfies the required CINR of BS 450, which is 6 dB, BS 450 can normally receive the BR header in step 430.

An exemplary process of transmitting/receiving signals through control of the transmission power using the descending normalized C/N table and the ascending normalized C/N table has been described with reference to FIGS. 3 and 4. That is, with reference to FIGS. 3 and 4, an exemplary process of transmitting/receiving signals through control of the transmission power using a new normalized C/N, which is different from the normalized C/N according to the related art, has been described.

Next, with reference to FIGS. 5 and 6, a process of transmitting/receiving signals by controlling transmission power using a normalized C/N offset in an IEEE 802.16 communication system according to an exemplary embodiment of the present invention will be described.

Figure 5:
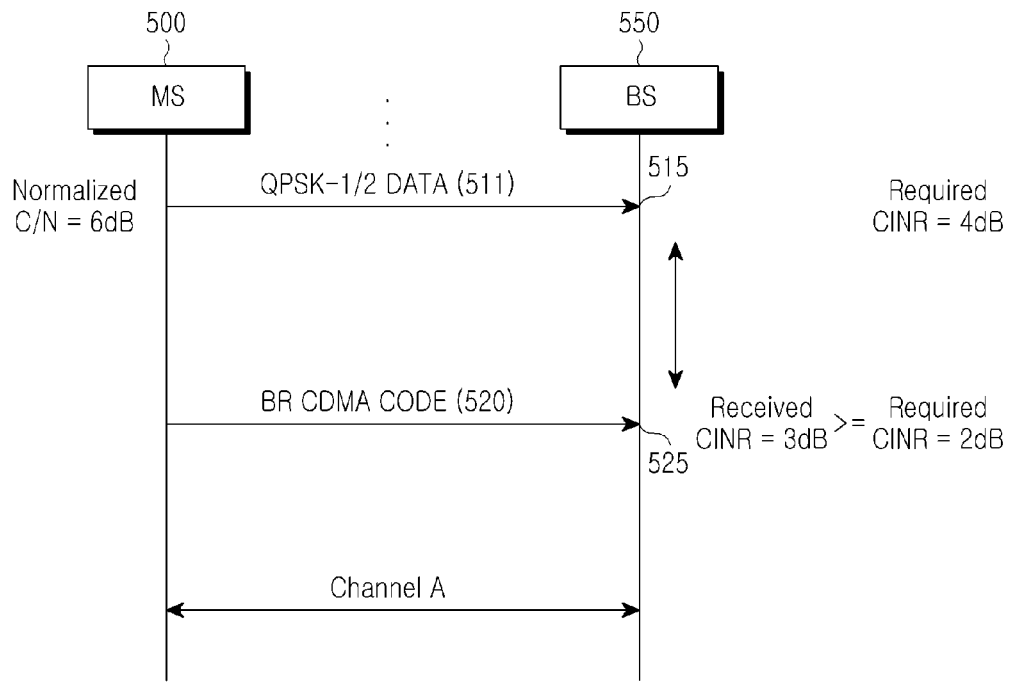
FIG. 5 is a flowchart illustrating an example of a process of transmitting/receiving signals by controlling the transmission power using a normalized C/N offset in an IEEE 802.16 communication system according to an exemplary embodiment of the present invention.

FIG. 5 is a flowchart illustrating an example of a process of transmitting/receiving signals by controlling transmission power using a normalized C/N offset in an IEEE 802.16 communication system according to an exemplary embodiment of the present invention.

Referring to FIG. 5, it is assumed that the channel state between MS 500 and BS 550 corresponds to channel A. In the case of transmitting the QPSK-1/2 data, MS 500 sets the default value of the corresponding transmission power to the normalized C/N of 6 dB as represented in Table 1. In step 511, MS 500 transmits the QPSK-1/2 data to BS 550 using the set normalized C/N of 6 dB. Although not illustrated in FIG. 5, in accordance with the power control algorithm, in step 515, the required CINR of the QPSK-1/2 data is set to 4 dB, and BS 550 transmits a power control message including the corresponding transmission power correction information to MS 500. MS 500, having received the power control message, determines the transmission power that suits the required CINR of 4 dB through the transmission power correction information. At this time, if it is required for MS 500 to transmit the BR CDMA code, MS 500 detects that the normalized C/N is 3 dB with reference to Table 1, and detects the difference of 3 dB between the detected normalized C/N and the normalized C/N applied to the previously transmitted signal, i.e. the QPSK-1/2 data. Since the modulation/FEC rate level used in the previously transmitted signal is higher than the modulation/FEC rate level to be used in the signal to be currently transmitted, in step 530 MS 500 transmits the BR CDMA code to BS 550 using transmission power of 3 dB obtained by subtracting the value of 1 dB, which is obtained by subtracting a normalized C/N offset of 2 dB from the current normalized C/N of 3 dB, from the current set point of 4 dB. If the modulation/FEC rate level used in the previously transmitted signal is higher than the modulation/FEC rate level to be used in the signal to be currently transmitted, MS 500 determines the transmission power to be used in the signal to be currently transmitted using Equation (1) or Equation (2) below. In the case of using Equation (1), MS 500 uses a closed-loop power control method, while in the case of using Equation (2), MS 500 uses an open-loop power control method.

$$P\text{new}=P\text{last}+(C/N\text{new}-C/N\text{offset}-C/N\text{last})-(10 \log 10(R\text{new})-10 \log 10(R\text{last}))+\text{Offset} \quad (1)$$

In Equation (1), Pnew denotes transmission power to be used in a signal to be currently transmitted, Plast denotes transmission power used in the previously transmitted signal, C/Nnew denotes a normalized C/N to be used in a signal to be currently transmitted, C/Noffset denotes a normalized C/N offset, C/Nlast denotes a normalized C/N used in the previously transmitted signal, Rnew denotes the number of repetitions of a modulation/FEC rate to be used in a signal to be currently transmitted, Rlast denotes the number of repetitions of a modulation/FEC rate used in the previously transmitted signal, and Offset denotes accumulation of power correction terms transmitted by BS during the previous transmission.

$$P(\text{dBm}) = L + C/N - C/N\text{offset} + NI - 10 \log 10(R) + \text{Offset\_SSperSS} + \text{Offset\_BSperSS} \quad (2)$$

In Equation (2), P denotes a transmission power level for each sub-carrier of a signal to be currently transmitted, and includes an MS transmission antenna gain. L denotes an estimated average uplink propagation loss, and includes an MS transmission antenna gain and a path loss, but excludes a BS receiving antenna gain. NI denotes an estimated average power level of interference and noise for each sub-carrier in BS, and does not include a BS reception antenna gain. Offset_SSperSS denotes a correction term for inherent power offset of the MS, and is a value controlled by the MS. Offset_BSperSS denotes a correction term for inherent power offset of the MS, and is a value controlled by the BS.

On the other hand, since the received CINR of the BR CDMA code, which is 3 dB, is above the required CINR of 2 dB, BS 550 can normally receive the BR CDMA code in step 525.

Figure 6:
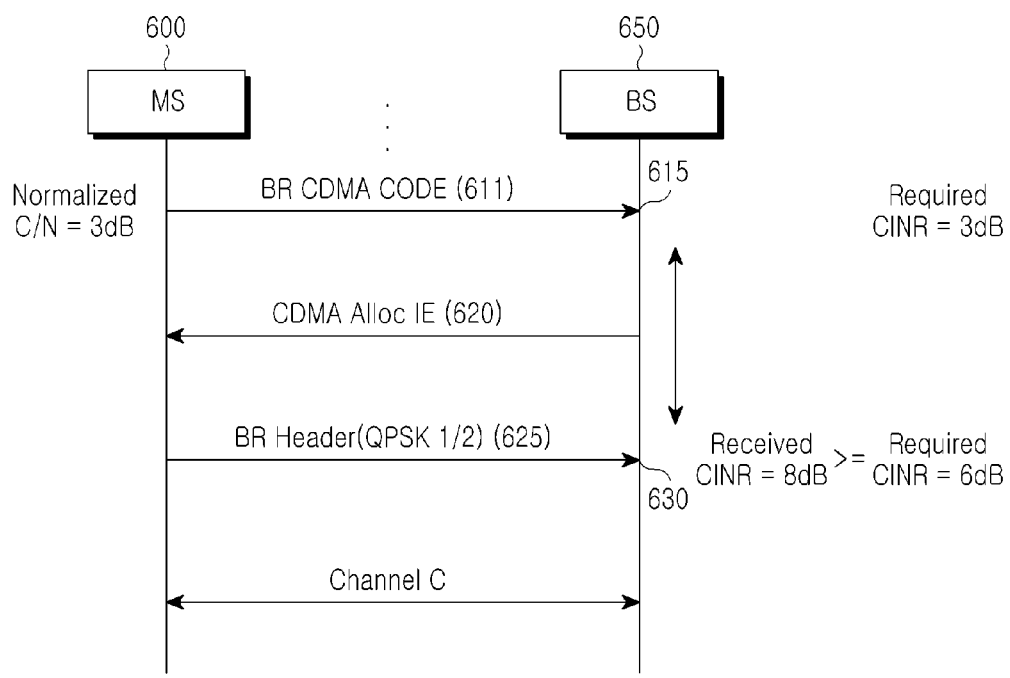
FIG. 6 is a flowchart illustrating an example of a process of transmitting/receiving signals by controlling the transmission power using a normalized C/N offset in an IEEE 802.16 communication system according to an exemplary embodiment of the present invention.

FIG. 6 is a flowchart illustrating an example of a process of transmitting/receiving signals by controlling transmission power using a normalized C/N offset in an IEEE 802.16 communication system according to an exemplary embodiment of the present invention.

Referring to FIG. 6, it is assumed that the channel state between MS 600 and BS 650 corresponds to channel C. In the case of transmitting the BR CDMA code, in step 611, MS 600 transmits the default value of the corresponding transmission power to BS 650 using the transmission power of the normalized C/N of 3 dB as represented in Table 1. In accordance with the power control algorithm, in step 615 the required CINR of the BR CDMA code is set to 3 dB, and although not separately illustrated in FIG. 6, BS 650 transmits a power control message including the corresponding transmission power correction information to MS 600. MS 600, having received the power control message, determines the transmission power that suits the required CINR of 3 dB through the transmission power correction information.

Alternatively, in step 620, BS 650 transmits CDMA allocation information element to MS 600, which includes bandwidth allocation information according to a bandwidth allocation request of MS 600. MS 600, having received the CDMA allocation information as described above, detects that it should transmit the BR header. Here, since the BR header corresponds to the QPSK-1/2 data, MS 600 detects that the modulation/FEC rate level of the QPSK-1/2 is higher than the modulation/FEC rate level of the CDMA code with reference to Table 1.

Also, since the modulation/FEC rate level used in the previously transmitted signal is lower than the modulation/FEC rate level to be used in the signal to be currently transmitted, in step 625, MS 600 transmits the BR CDMA code to BS 650 using transmission power of 8 dB obtained by adding a value of 5 dB, which is obtained by subtracting the previous normalized C/N of 3 dB from a value of 8 dB that is obtained by adding a normalized C/N offset of 2 dB to the current normalized C/N of 6 dB, to the current set point of 3 dB. If the modulation/FEC rate level used in the previously transmitted signal is lower than the modulation/FEC rate level to be used in the signal to be currently transmitted, MS 600 determines the transmission power to be used in the signal to be currently transmitted using Equation (3) or Equation (4) below. Here, in the case of using Equation (3), MS 600 uses a closed-loop power control method, while in the case of using Equation (4), MS 600 uses an open-loop power control method.

$$P\text{new} = P\text{last} + (C/N\text{new} + C/N\text{offset} - C/N\text{last}) - (10 \log 10(R\text{new}) - 10 \log 10(R\text{last})) + \text{Offset} \quad (3)$$

$$P(\text{dBm}) = L + C/N + C/N\text{offset} + NI - 10 \log 10(R) + \text{Offset\_SSperSS} + \text{Offset\_BSperSS} \quad (4)$$

On the other hand, since the received CINR of the BR header, which is 8 dB, is above the required CINR of 6 dB, BS 650 can normally receive the BR header of MS 600 in step 630.

According to an exemplary embodiment of the present invention, although not separately illustrated, the MS may pre-store the descending normalized C/N table, the ascending normalized C/N table, and the normalized C/N offset, or the BS may inform the MS of the tables and offset through a separate message such as an Uplink Channel Descriptor (UCD) message and so on.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of determining transmission power in a communication system, the method comprising:

comparing a first modulation/Forward Error Correction (FEC) rate level, which is a modulation/FEC rate level used in a previously transmitted signal, with a second modulation/FEC rate level, which is a modulation/FEC rate level to be used in a currently transmitted signal;

if the second modulation/FEC rate level is higher than the first modulation/FEC rate level, determining a transmission power using a normalized Carrier to Noise ratio (C/N) corresponding to the second modulation/FEC rate level on an ascending normalized C/N table; and if the second modulation/FEC rate level is lower than the first modulation/FEC rate level, determining the transmission power using a normalized C/N corresponding to the second modulation/FEC rate level on a descending normalized C/N table.

2. The method of claim 1, wherein a difference between normalized C/N values corresponding to modulation/FEC rate levels included in the ascending normalized C/N table is set to be larger than a difference between normalized C/N values corresponding to the modulation/FEC rate levels included in the descending normalized C/N table.

3. The method of claim 1, wherein a difference between normalized C/N values corresponding to modulation/FEC rate levels included in the descending normalized C/N table is set to be smaller than a difference between normalized C/N values corresponding to the modulation/FEC rate levels included in the ascending normalized C/N table.

4. An apparatus in a mobile terminal for determining transmission power in a communication system, wherein the apparatus compares a first modulation/Forward Error Correction (FEC) rate level, which is a modulation/FEC rate level used in a previously transmitted signal, with a second modulation/FEC rate level, which is a modulation/FEC rate level to be used in a currently transmitted signal, and further wherein, if the second modulation/FEC rate level is higher than the first modulation/FEC rate level, the apparatus determines a transmission power using a normalized Carrier to Noise ratio (C/N) corresponding to the second modulation/FEC rate level on an ascending normalized C/N table, and if the second modulation/FEC rate level is lower than the first modulation/FEC rate level, the apparatus determines the transmission power using a normalized C/N corresponding to the second modulation/FEC rate level on a descending normalized C/N table.

5. The apparatus of claim 4, wherein a difference between normalized C/N values corresponding to modulation/FEC rate levels included in the ascending normalized C/N table is set to be larger than a difference between normalized C/N values corresponding to the modulation/FEC rate levels included in the descending normalized C/N table.

6. The apparatus of claim 4, wherein a difference between normalized C/N values corresponding to modulation/FEC rate levels included in the descending normalized C/N table is set to be smaller than a difference between normalized C/N values corresponding to the modulation/FEC rate levels included in the ascending normalized C/N table.

7. A method of determining transmission power in a communication system, the method comprising:
- comparing a first modulation/Forward Error Correction (FEC) rate level, which is a modulation/FEC rate level used in a previously transmitted signal, with a second modulation/FEC rate level, which is a modulation/FEC rate level to be used in a currently transmitted signal; and
- determining a transmission power using a normalized Carrier to Noise ratio (C/N) corresponding to the second modulation/FEC rate level and a normalized C/N offset on a normalized C/N table in accordance with the result of the comparison,
- wherein the determining of the transmission power comprises, when the second modulation/FEC rate level is higher than the first modulation/FEC rate level, using a value obtained by adding the normalized C/N offset to the normalized C/N corresponding to the second modulation/FEC level.

8. The method of claim 7, wherein the determining of the transmission power comprises, if the second modulation/FEC rate level is lower than the first modulation/FEC rate level, using a value obtained by subtracting the normalized C/N offset from the normalized C/N corresponding to the second modulation/FEC level.

9. An apparatus in a mobile terminal for determining transmission power in a communication system, wherein the apparatus compares a first modulation/Forward Error Correction (FEC) rate level, which is a modulation/FEC rate level used in a previously transmitted signal, with a second modulation/FEC rate level, which is a modulation/FEC rate level to be used in a currently transmitted signal, and further wherein the apparatus determines a transmission power using a normalized Carrier to Noise ratio (C/N) corresponding to the second modulation/FEC rate level and a normalized C/N offset on a normalized C/N table in accordance with the result of the comparison,
- wherein, when the second modulation/FEC rate level is higher than the first modulation/FEC rate level, the apparatus determines the transmission power using a value obtained by adding the normalized C/N offset to the normalized C/N corresponding to the second modulation/FEC level.

10. The apparatus of claim 9, wherein if the second modulation/FEC rate level is lower than the first modulation/FEC rate level, the mobile terminal determines the transmission power using a value obtained by subtracting the normalized C/N offset from the normalized C/N corresponding to the second modulation/FEC level.

* * * * *